(12) United States Patent
Guy

(10) Patent No.: US 9,892,535 B1
(45) Date of Patent: Feb. 13, 2018

(54) DYNAMIC MESH GENERATION TO MINIMIZE FILLRATE UTILIZATION

(71) Applicant: Google Inc., Mountain View, CA (US)

(72) Inventor: Romain P. Guy, Millbrae, CA (US)

(73) Assignee: Google Inc., Mountain View, CA (US)

( * ) Notice: Subject to any disclaimer, the term of this patent is extended or adjusted under 35 U.S.C. 154(b) by 485 days.

(21) Appl. No.: 13/735,636

(22) Filed: Jan. 7, 2013

Related U.S. Application Data (60) Provisional application No. 61/583,503, filed on Jan. 5, 2012.

(51) Int. Cl.
  *G09G 5/00* (2006.01)
  *G06T 11/60* (2006.01)
  *G06T 11/00* (2006.01)

(52) U.S. Cl.
  CPC ............ *G06T 11/60* (2013.01); *G06T 11/001* (2013.01)

(58) Field of Classification Search
  CPC ........... H04N 13/0029; H04N 13/0048; H04N 13/0438; H04N 1/0029; G06F 17/212; G06F 3/012; G06F 3/04842; G06F 8/34; G06F 3/0416; G06F 3/04817; G06N 3/04; G09G 2340/12; G09G 2340/0457; G06T 2210/62
  USPC ....................................... 345/582
  See application file for complete search history.

(56) References Cited

U.S. PATENT DOCUMENTS

| | | | |
|---|---|---|---|
| 6,784,894 B2 | 8/2004 | Schimpf | |
| 6,791,543 B2 | 9/2004 | Kawanaka | |
| 7,034,823 B2 | 4/2006 | Dunnett | |
| 7,102,636 B2 | 9/2006 | Reshetov | |
| 7,178,125 B1 | 2/2007 | Huang | |
| 7,280,106 B2 | 10/2007 | Hong | |
| 7,304,647 B2 | 12/2007 | Hong | |
| 8,379,058 B2* | 2/2013 | Kraut | 345/647 |
| 2004/0032409 A1* | 2/2004 | Girard | G06T 15/60 345/426 |
| 2004/0183807 A1* | 9/2004 | Emberling et al. | 345/552 |
| 2005/0122337 A1* | 6/2005 | Chen | 345/545 |
| 2006/0107229 A1* | 5/2006 | Matthews | G06F 3/0481 715/782 |
| 2007/0060346 A1* | 3/2007 | Edwards | 463/31 |
| 2008/0158254 A1* | 7/2008 | Jiang | G06T 11/00 345/629 |
| 2013/0088491 A1 | 4/2013 | Hobbs | |

FOREIGN PATENT DOCUMENTS

| | | |
|---|---|---|
| EP | 923766 B1 | 5/2003 |
| EP | 1221674 A3 | 9/2003 |
| WO | W09827515 A1 | 6/1998 |

* cited by examiner

*Primary Examiner* — Yuehan Wang
(74) *Attorney, Agent, or Firm* — Fish & Richardson P.C.

(57) ABSTRACT

Methods, systems, and apparatus, including computer programs encoded on a computer storage medium, for generating a dynamic mesh for rendering with a graphical user interface. Graphical objects are rendered onto a layer having transparent pixels. The system infers what areas of the layer are drawn areas, and a mesh is generated based on the drawn areas.

18 Claims, 8 Drawing Sheets

DYNAMIC MESH GENERATION TO MINIMIZE FILLRATE UTILIZATION

CROSS-REFERENCE TO RELATED APPLICATION

This application claims priority to U.S. Provisional Application Ser. No. 61/583,503, filed on Jan. 5, 2012, the entire contents of which are hereby incorporated by reference.

TECHNICAL FIELD

This document relates to components of computer operating systems, including components for buffering graphical rendering commonly referred to as layers.

BACKGROUND

Computer operating systems perform a number of functions, including serving as a bridge between computer hardware and computer applications that run on the operating systems. Modern computer operating systems also provide basic graphical user interfaces (GUIs) by which users can interact with components of the operating system in more intuitive manners. For example, an operating system may define basic graphical building blocks that applications can access so that they can generate advanced and consistent user interfaces relatively easily.

The various objects that are part of a GUI may be segregated into various display layers, with some layers appearing in front of other layers. For example, when a user launches an application from a home screen including icons, the window for the application may become active, and move visually in front of other objects that were previously displayed on a home screen. The home screen, as well as a number of applications, may include back-most layer that fills substantially all of the display and acts as a background, or as wallpaper when the background is formed from a graphical image. Icons that can be selected by a user to launch or maximize applications may be displayed on a visual layer in front of the background but behind any open applications. Certain layers may be rendered into one or more off-screen buffers before they are displayed, e.g., to permit a system to add effects to displayed elements and/or to permit performance improvements.

Some of the visual layers, such as a visual layer that displays icons in front of the background, may include areas of transparent pixels that allow portions of the layers behind them to be visible. These transparent pixels represent parts of the layer that do not include any visual image and therefore should not obstruct the display of images from other layers, whether in front of or behind the layer. These transparent pixels therefore provide no additional data for rendering the screen image, but essentially represent "null" data for certain pixels of the layer.

Nonetheless, when each layer of the GUI is rendered, each of these transparent pixels is processed as part of processing the layer. For mobile devices and other situation with resource constraints on graphics processing, the number of pixels per second or per cycle that can be processed, the fillrate, can be a hard constraint on the speed of the system. Thus, large areas of transparent pixels in a layer can slow the rendering of the resource, increasing the amount of time it takes to render a full frame of the display (and correspondingly decreasing the frame rate).

SUMMARY

This document describes systems and techniques that may be used for managing objects within a graphical user interface for a computer operating system. As described in examples herein, as a layer is rendered into an offscreen buffer, a process can identify coordinates for rectangles that encompass certain drawn objects, each time such an object is added to the buffer. When each of the objects is created and the rectangle coordinate identified, a mesh may be created out of triangles that map to the rectangles (e.g., each triangle of the mesh may encompass half the area of a corresponding rectangle, and may share three of the four coordinates for the rectangle (where a paired other triangle may cover the other half of the corresponding rectangle). The rendered layer may then be used as a texture mapped to the mesh, and the mesh may be sent to the GPU for appropriate processing. In this manner, a limited area of the layer will need to be processed by the GPU, and the process can avoid having the GPU spend processing resources on pixels that do not need rendering, i.e., that are transparent or otherwise do not include graphical elements that need to be fully processed.

As one example, a computer-implemented method includes rendering one or more graphical objects comprising pixels onto a layer having transparent pixels; inferring a drawn area for each graphical object rendered onto the layer, the drawn area encompassing all of the pixels rendered as that graphical object; generating a mesh, the mesh mapping each of the drawn areas of the layer, the mesh failing to map at least one area having only transparent pixels; and providing the mesh for rendering as part of a graphical user interface.

In some implementation, the method may also include receiving the mesh and processing each pixel mapped by the mesh such that at the pixels comprising the at least one area not mapped by the mesh are not processed. The method may further include receiving a background layer, the background layer having corresponding pixels to the at least one area of the layer having only transparent pixels; processing the corresponding pixels of the background layer; and displaying at least some of the pixels mapped to the mesh and at least some of the corresponding pixels of the background layer on a graphical user interface.

In some implementations, a texture representing the drawn areas of the layer is generated and mapped to the mesh. Also, an unused layer fraction, representing a fraction of the pixels of the layer that are not within any drawn area inferred for any graphical object rendered onto the layer, can be calculated. The mesh can be generated based on a determination that the unused layer fraction exceeds a threshold value. The threshold value may be at or above 60%.

The details of one or more implementations are set forth in the accompanying drawings and the description below. Other features and advantages will be apparent from the description and drawings, and from the claims.

DETAILED DESCRIPTION

This document describes mechanisms by which an operating system may manage interactions with graphical objects that can be viewed by and/or manipulated by a user of a computing device, e.g., via an electronic display and optional overlying touch-sensitive surface. The graphical objects in the example implementations include objects that are displayed as part of a home screen for an operating device—the screen that is shown behind applications that may be opened by a user, such as to replace the applications when a user has minimized all such applications. Traditionally, a home screen includes a background, which may extend across substantially all of a display (e.g., except for a task bar or status bar around the display periphery or on a portion of the display periphery) and may be a plain color, or may include an image, animation, or interactive mechanism (e.g., that changes its display in response to motion of the device or user contact with the display, such as to display a map of a current location of the device as the device moves in a geography, or to show ripples in a water wallpaper where a user touches the display) in the form of wallpaper.

Icons may be shown on a visual layer in front of the background, meaning that the icons can be moved independently of the wallpaper, and are displayed by the device visually on top of the wallpaper, so that when there is an overlap, the icons are shown and the wallpaper is obscured. Icons may be displayed according to specific rules that specify their spacing and position. Individual icons may be selected and arranged by the user of the device. Often, selection of an icon by a user will initialize an application or initiate a system process.

On some devices, multiple screens' worth of icons may be available, each representing a different arrangement and selection of application and system processes for the user's selection. Where multiple screens of icons are available, each screen may represent a separate layer. In selecting a different screen from the one displayed, the device may display an existing icon layer moving off the screen to accommodate a new icon layer moving on the screen. Other manipulations of the icon layer may be possible. The icon layer may move while the background layer, including the wallpaper, does not. Alternatively, graphical manipulation of the background layer may also occur as part of icon screen selection.

Widgets, static desktop objects, may be shown in another visual layer or in the same layer as the icons. Widgets may perform a variety of useful functions on the desktop while not requiring deliberate initialization by a user or changing the focus of the display like an application. Widgets may obey a variety of spacing and display rules, and may overlay other layers in order to provide a benefit even while the user's primary focus is elsewhere with regards to the device. Clocks, timers, tickers, and other low-impact displays are often found as widgets. Messaging and broadcasting feeds may also be available as widgets, in addition to user history, settings, and other functions.

In addition, open applications may be shown in a front-most visual layer, so that when an application is maximized, none of the other layers is shown. In some implementations, a maximized application may result in the other layers not being processed at all until the application no longer takes up the entire screen One or more applications may be considered to each be a layer (as described below with respect to FIGS. 3A-C.

Graphics rendering within applications may also use layers; for example, an application may have a primary window and secondary windows for display, settings, dialog, and other capabilities. Because layers reduce the rendering time for collections of graphical objects, the use of multiple graphical objects within a display may also lead to the use of layers to buffer those objects within the display. Therefore, although the examples disclosed herein primarily address layers in the context of a home screen, it should be understood that any use of layers with significant areas of transparent pixels can benefit from excluding transparent pixels from processing in order to conserve graphical resources.

The computing devices shown in the graphical implementations are mobile devices. Mobile devices include handhelds, phones, laptop PCs, and tablet PCs among other portable electronic devices. Due to their relatively modest size and constraints on power consumption, often the graphical resources of mobile devices are relatively limited. Graphics systems on mobile devices therefore have limitations on their performance and may benefit greatly from improvements in resource utilization and efficiency. Mobile devices therefore represent one class of device where the GPU may have only a modest fillrate, and therefore can greatly benefit from a reduction in the number of pixels associated with the GUI that must be processed to generate each frame.

However, the use of this invention is not limited to mobile devices; any device that suffers a bottleneck in graphics processing due to its fillrate may benefit. Devices in many classes include limited GPU capabilities, and may not have a dedicated graphical processing unit but may instead use a multi-purpose CPU for graphics processing as well. Bottlenecks are also relative; even a powerful desktop PC may, under some circumstance, still be constrained as to how quickly it can refresh a page according to a fillrate that is slow relative to the other capabilities of the system.

Figure 1:
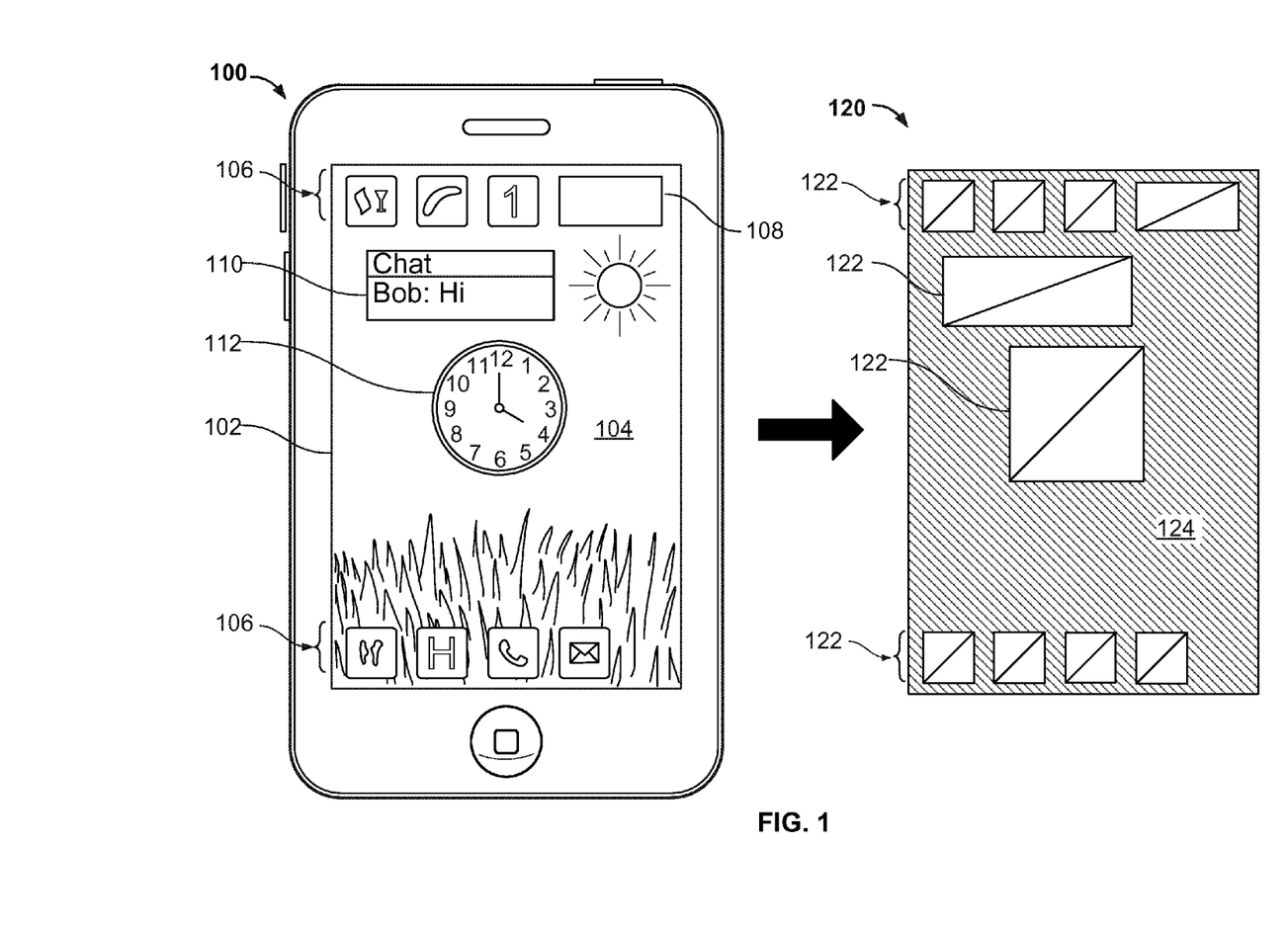
FIG. 1 shows a computing device displaying a graphical user interface and a mesh generated from a layer of the display.

A general home screen layout is shown in FIG. 1, where a computing device 100 (e.g., a smart phone, tablet device, laptop device, pad device, personal digital assistant, electronic reading device, or the like) with a display screen presents a graphical user interface 102, a touchscreen interface in the present example. The GUI 102 is rendered, processed, and displayed several times each second in order to provide the user with the most up-to-date information on the state of the device 100 and to promptly react to user input.

The GUI 102 may include a variety of graphical objects for display, which may be rendered as one or more layers. For example, the background 104, exhibiting a pleasant wallpaper image of grass under a sunny sky, may represent a layer that substantially fills the area available for display. The background layer 104 may be substantially static or may be animated. The background layer 104 may, in some embodiments, display a user selected image as a wallpaper, or may select from a plurality of user-selected images.

Image processing, such as stretching, positioning, or tiling an image, may be involved in generating a wallpaper. In some implementations, by accessing and rendering onto a layer, any rendering necessary to generate the wallpaper or any other components of the background do not have to be repeated each time the background is drawn.

Another layer may include some or all of the elements to be shown forward of the background 104. This layer may include icons 106, each of which may initialize an application or system process upon selection by the user (such as by touching the screen at the location of the icon).

The layer may also include a search box 108, which may represent a widget wherein a user enters search terms as text into the box. The search widget 108 may search the memory of the device for any appropriate application, widget, user contact, or other reference to words entered for the search. Instead or in addition, the search widget 108 may interface with web-enabled components of the device in order to use a search engine to return internet results responsive to words entered for the search. These results may be displayed on a widget display or may open an application for display of the results; for example, a browser client may be initialized to show search engine results.

The layer may also include a chat window 110, which may be generated by a widget allowing text communication between the user and other users. The widget may display text messages, instant messages, published, or broadcast data. The user may be able to select the chat window in order to send a message to another user or to publish content to an audience. Selecting the chat window may allow the user to interact directly with the widget or may initialize, and allow the user to interact with, an application associated with the widget.

The layer may also include a clock 112, which may be generated by a widget that displays and updates status information to a user. Although shown as a clock 112 that may display the time, a status information widget may also display a stock or news ticker, weather or location information, notifications about incoming email and other messages, or any other data updated on a periodic or continuous basis.

In the present example, while the GUI 102 uses a touchscreen interface, many of the graphical objects respond to the user's touch. The touch screen may also respond to different touches in different ways. For example, a touch that is interpreted as a drag may move an icon, while a touch that is interpreted as a tap may select the icon. The GUI 102 may also use a cursor interface, where moving, or dragging the cursor by touch or with an input device such as a track pad or mouse may have effects on the system in addition to those associated with clicking on a graphical object. In some implementations wherein multiple graphical objects may share the same location on the screen, only the front (that is, visible) object responds to user selection of that screen location. The ordering and positioning of layers on the screen is therefore relevant to the functionality of the device.

FIG. 1 illustrates a mesh 120 which, according to one implementation, may be generated as part of the process for displaying the GUI 102. The mesh 120 maps triangles 122 over regions associated with each of the graphical objects 106, 108, 110, 112 that are to be rendered as part of a specific layer. The shaded region 124 represents areas of the GUI 102 which have no objects to display within the layer, and therefore do not need to be processed as part of processing the layer.

The mesh 120 may be a data structure representing the triangles 122 as a set of vertexes and a list of faces referencing the vertexes (that is, a face-vertex mesh). Other data structures for the mesh are possible, including edge-vertex, vertex-vertex, or the like. The mesh 120 lists each element necessary to determine the bounds of each face, and therefore identifies which parts of the display will be rendered with respect to the identified layer.

Although shown as part of the mesh 120, certain objects, such as the chat window 110 or clock 112, may not be included in the same layer as the icons 106 or the search box 108. The decision to include or not include an element in a layer may be dependent on how often a certain element is expected to change, and therefore how often it will be necessary to re-render the layer in response to a change in the display of the events. For example, icon objects 106 may be relatively stable; that is, the icon objects 106 may generally be rendered the same over many frames of the display, not requiring any re-rendering. In contrast, the clock 110 (or other status update widget) or chat window 112 (or other message or content display widget) may be expected to change regularly or periodically, and so are less relatively stable. Therefore, these widgets may be better rendered onto a separate layer or not rendered onto a layer at all.

The decision as to whether or not to include graphical objects on the same layer or to use additional layers represents a trade-off between a cost overhead of generating and processing the layer and a cost savings of not re-rendering the elements rendered to the layer. However, the cost overhead of generating and processing the layer includes the resource cost of processing transparent pixels; therefore, the introduction of the mesh as herein described reduces the costs associated with adding layers. Therefore, the existence of the mesh as herein described, may change the calculation as to how many layers to have and what elements to render on each layer, as adding a layer no longer necessarily entails adding a number of pixels equal to the outermost dimensions of the layer.

Figure 2:
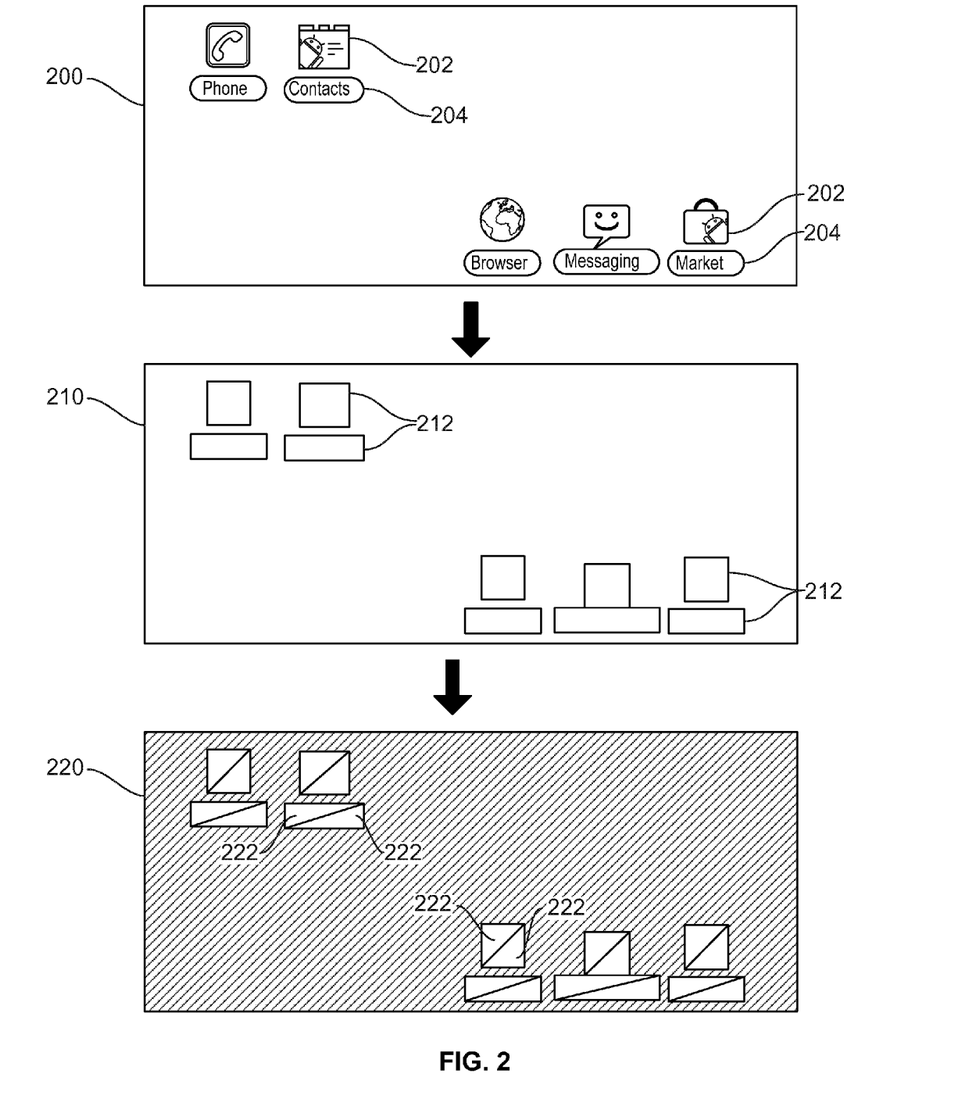
FIG. 2 shows a layer, inferred drawn areas of the layer, and a mesh generated from the layer.

FIG. 2 shows a single layer 200 for display on a GUI. The graphical objects added to the layer 200 represent application icons 202 and application titles 204. Pixels of the layer 200 not occupied by the graphical objects 202, 204 are transparent, allowing pixels from layers behind the layer 200, such as a background layer for example, to be displayed as well.

If processed naively, each graphical object 202, 204 would need to be rendered individually by processing the data associated with each object 202, 204, which may include a number of rules for rendering icons and text, as well as retrieving image files associated with each icon 202 and each application title 204. Relational rules for ordering, spacing, and assuring non-overlap in display may also be included. Rendering each of the graphical objects 202, 204 may thus involve a considerable number of drawing commands, which require time and system resources to process.

By drawing each of the graphical objects to the layer 200, the application can subsequently render the layer without having to re-enter the individual drawing commands that went into rendering the layer. Thus, the layer 200 provides substantial savings in the time and processing required by rendering software in refreshing and re-drawing a set of images.

However, the layer 200 also includes a large number of transparent pixels. In order to reduce the fillrate utilization of the layer 200, the application generates a mesh that maps which areas of the layer 200 have pixels that need to be processed.

In one implementation, as illustrated by the diagram 210 in FIG. 2, the dimensions of the objects 202, 204 are marked by rectangles 212. Rectangles 212 may be used because the information necessary to produce them may already be available as part of drawing the icons and titles. Each rectangle 212 may represent a maximum height, maximum width, and coordinate value for each object 202, 204. Although each object 202, 204 may not extend to the full area of the rectangle 212, all of the object 202, 204 will fit within the rendered rectangle 212. When all objects 202, 204 have been marked by rectangles 212, the collective area of the rectangles 212 includes every part of the layer 200 having pixels that must be processed to properly display the layer 200 within a graphical user interface.

Because the objects 202, 204 will not generally extend to the full area of the rectangles 212, the regions covered by the rectangles 212 may still include a significant number of transparent pixels which, because they are included in the drawn area represented by the rectangles 212, will still be processed by the graphics system. In fact, in certain areas, such as in and around the application titles 204 for example, transparent pixels may even constitute the majority of pixels. The decision to use rectangles 212 in some implementations is a trade-off between the added efficiency in excluding transparent pixels with the resource costs associated with generating and maintaining a more complex mesh. The rectangles 212 exclude large areas of transparent pixels while processing quickly and resulting in a relatively limited number of polygons for the resulting mesh. Nonetheless, in some implementations, the increased efficiency of excluding more transparent pixels may be worth the time and resources necessary to more finely identify and tailor the drawn areas closer to the extent of the graphical objects.

A mesh 220 in FIG. 2, similar to the mesh 120 described above with respect to FIG. 1, is generated based on the rectangles 212. Each rectangle 212 can be trivially processed as two triangles 222 within the mesh 220, right triangles meeting at their two acute corners. Because of the special nature of these triangles 222 as right triangles with legs parallel to the coordinate axis, each triangle 222 can be uniquely defined by the location of the right angle and the length of its two legs, using positive and negative length values to denote direction. However, each triangle 222 may be defined, by its corners and/or sides according to the preferred data structure for use with the mesh 220.

Additional data structures for storing the mesh 220 are possible. For example, because every area in the mesh is defined by a rectangle 212 in this example, a mesh of four-vertex polygons would store the rectangle vertexes and reduce the number of polygons stored by half. However, because designers may be more familiar with a traditional three-vertex face-vertex mesh, which may also be the mesh data structure most likely to be supported and compatible with existing graphical processing systems, the triangle mesh 220 may be the preferred option in many implementations.

Figure 3A:
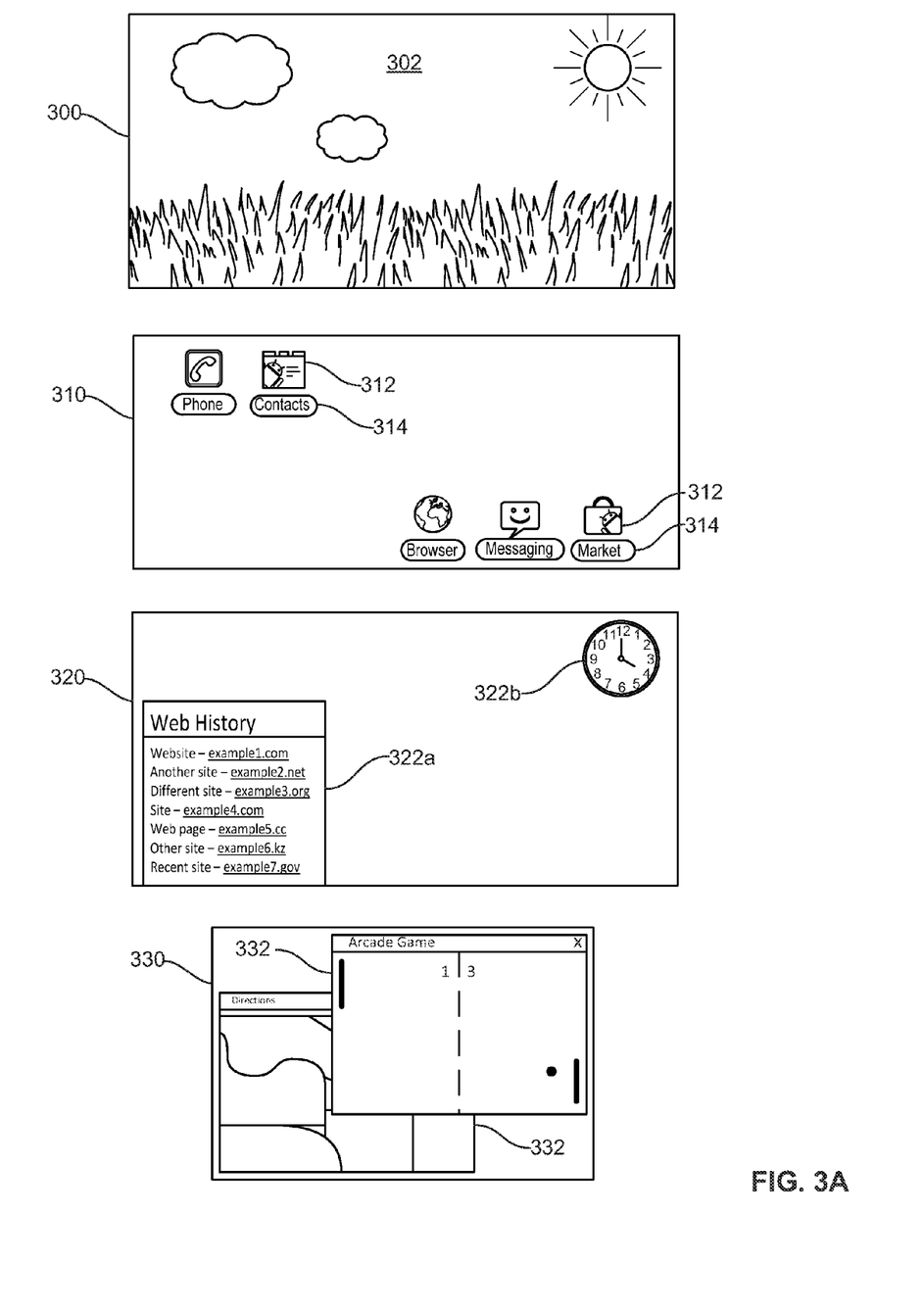
FIG. 3A shows four layers associated with a display.

FIG. 3A illustrates a set of layers 300, 310, 320, and 330 which may be overlaid to produce a display on a user device such as a tablet computer. Layer 300 is a background layer comprising an image 302, and forms the rearmost layer of the display. The background layer 300 has no transparent pixels, as is typical for a background layer 300. Because the background may display a single wallpaper image that is manipulated to fit a display screen but then remains static throughout a large number of frames, the background takes great advantage of a layer 300 in order to reduce redundant rendering. However, because the background layer 300 is a fully opaque rear layer, the background layer 300 it may not significantly optimize use of the fillrate to generate a mesh for the background layer 300.

Layer 310 is an icon layer comprising several icons 312 and their titles 314; for convenience, it is the substantially the same as the icon layer 200 illustrated and described above with respect to FIG. 2. The icon layer 310 is in front of the background layer 300, and includes significant areas of transparent pixels wherever the graphical objects 312, 314 are absent from the layer 310. As explained above, the variety of graphical objects 312, 314 along with their drawing rules make these icons a good candidate for the user of a layer 310. Unlike the background layer 300, the relatively high percentage of transparent pixels relative to total pixels in the layer 310 also allows the system to benefit from generating a mesh in order to reduce system load by avoiding processing the transparent pixels.

A widget layer 320, in front of the icon layer 310 and background layer 300, includes widgets 322a, 322b and transparent pixels wherever the widgets 322a, 322b are absent. A web history tool 322a docks at the bottom of the display and provides quick access to the last few browser results; an analog clock 322b tells the time. In this implementation, the widget layer 320 is separate from the icon layer 310. Because the widget layer 310 includes two widgets 322a, 322b rendered in opposite quadrants of the display, the layer 310 includes a particularly large fraction of transparent pixels. The graphics system may therefore greatly benefit by generating a mesh that includes the two widgets 322a, 322b in relatively small drawn areas in order to exclude large areas of transparent pixels from processing.

An application layer 330, in front of the other three layers 300, 310, 320, includes windows 332 corresponding to open applications. Although the overlapping windows 332 do leave some transparent pixels in the corners, the percentage of transparent pixels in the application layer 330 may be significantly less than on other layers, and so the system may render the full extent of the layer 330 without generating a mesh.

Although described for purposes of this example as a single layer 330, it will be recognized that the window 332 associated with each application often serves as its own layer. This is because different windows 332 may overlap each other, as shown, and so different precedence rules among applications may determine which window 332 is displayed on top of the other windows 332. Additionally, a layer may often match the dimensions of the application window rather than occupying the whole screen, which minimizes wasted resources by supplying few if any transparent pixels to be processed. Thus, additional application windows may be less resource-intensive than additional windows of other kinds.

As illustrated in FIG. 3A, icon layer 310 and window layer 330 do not have dimensions equal to the full size of the display, but are instead smaller, more closely matching the size of the graphical objects that are included on each layer. In contrast, the background layer 300 and widget layer 320 each have dimensions corresponding to the full dimensions of the display.

In other implementations, layers may always default to the full dimensions of the display, so as to more easily respond to the system's or user's repositioning of elements onto parts of the display that might exceed the bounds of the layer. Defaulting to layers having the full dimensions of the display may also be more feasible when mesh generation is available, as the mesh can greatly reduce the increase in the number of pixels processed when a new layer is introduced having content in only one or two areas of the display.

Figure 3B:
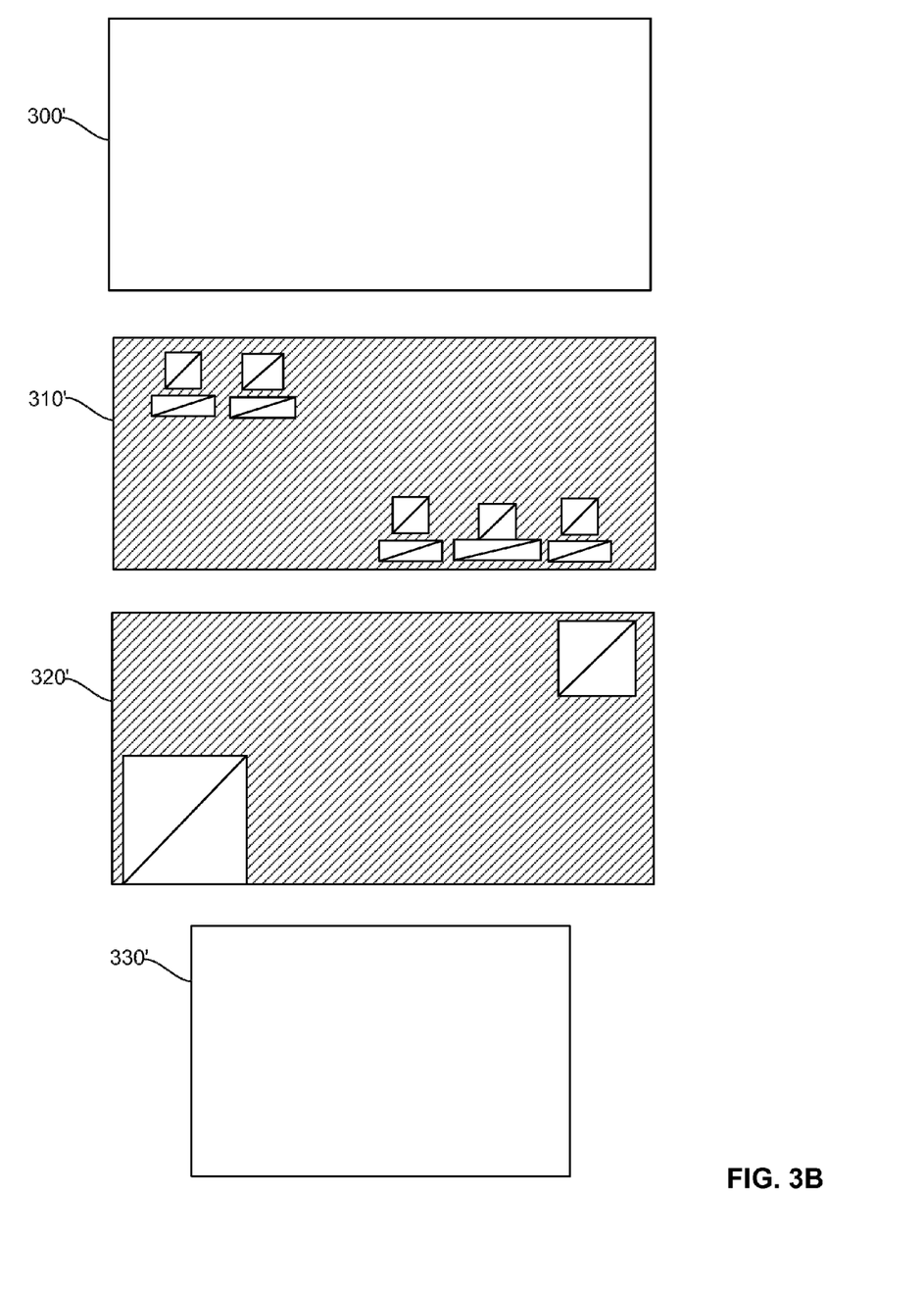
FIG. 3B is a diagram showing the drawn areas of the four layers of FIG. 3A after meshes are generated from two of the layers.

In one implementation, layers 310 and 320 may be converted to meshes as herein described while layers 300 and 330 are not. FIG. 3B illustrates diagrammatically with layers 300' and 330' and meshes 310' and 320' which pixels in each layer may be processed, solid white areas representing processed pixels and shaded areas representing unprocessed pixels.

Because meshes are not generated for layers 300 and 330, the entire area of these two layers is solid white, representing that the entire area will be processed. Because neither the layer 300 nor the layer 330 is made up primarily of transparent pixels, the use of a dynamic mesh generated for either of these layers may not be efficient in some circumstances.

The triangles on the two meshes 320' and 330' are solid, while the rest of the area of the meshes is shaded, representing the areas of transparent pixels that are not processed. In both of the meshes 320' and 330' as illustrated, more than 80% of the pixels are within the unprocessed area, which represents a significant optimization in the utilization of the system fillrate.

In some implementations, a calculation may be made to determine that some threshold area (either a percentage of the layer or an absolute number of pixels) may be excluded from processing by the use of a dynamic mesh. In other implementations, certain layers of the display that tend to be more empty may include dynamic mash generation as a normal part of their rendering and display, while other layers that tend to be more full may not include dynamic mesh generation.

Figure 3C:
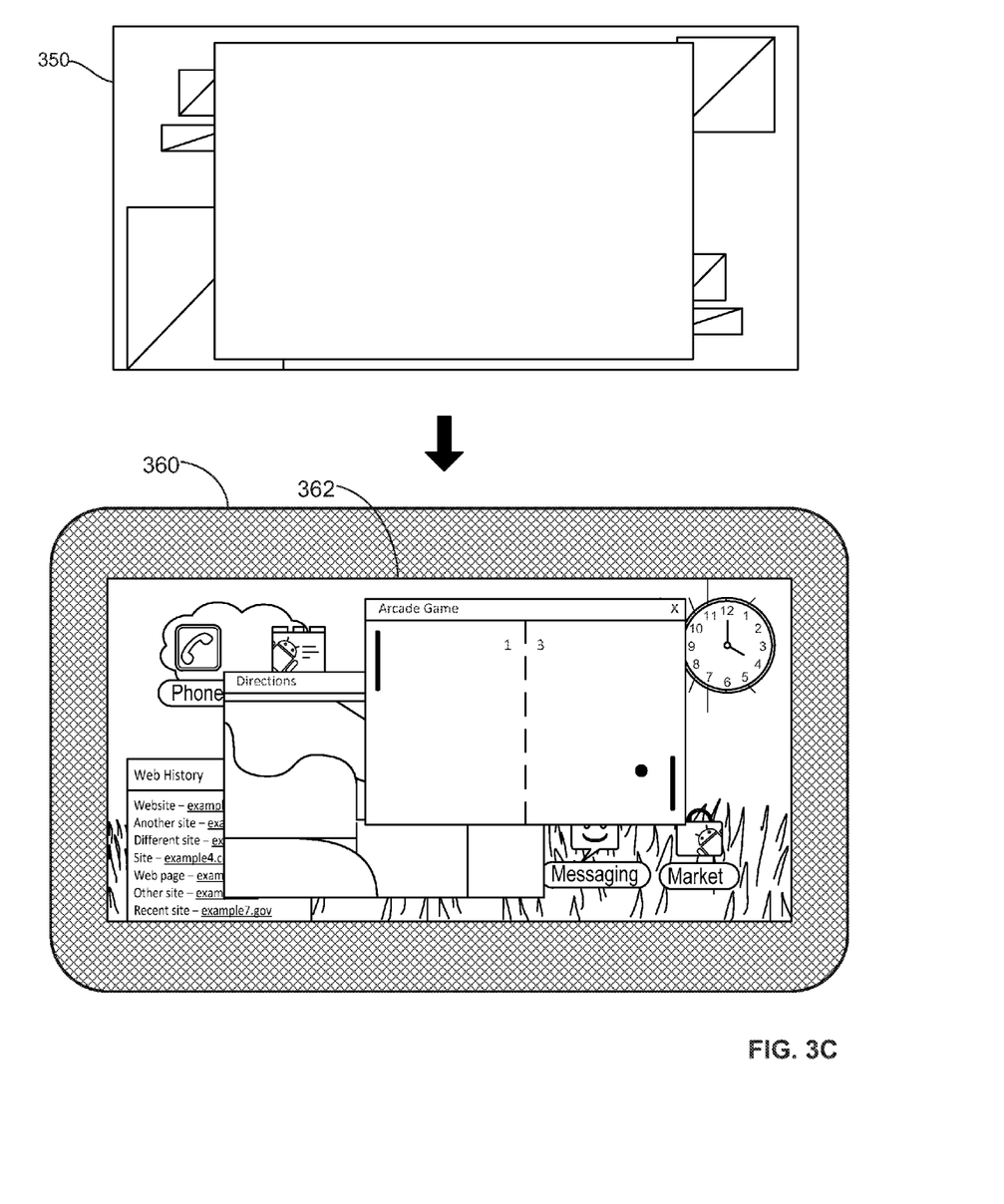
FIG. 3C shows the combination of the four layers into a single display and a computing device displaying the content of the four layers.

FIG. 3C shows the processed areas of the four layers superimposed as a single display 350, resulting in a display screen 362 on a mobile device 360. As shown in FIG. 3C, some layers may still have significant areas of transparent pixels that are processed despite the generation of one or more mesh as described herein. Greatly reducing the number of unnecessarily processed pixels increases the speed of the GPU even if some transparent pixels are processed; and, as explained above, the increased complexity in excluding additional transparent pixels from the dynamic mesh may provide reasons to rely on the simpler, block approach to the problem.

Figure 4:
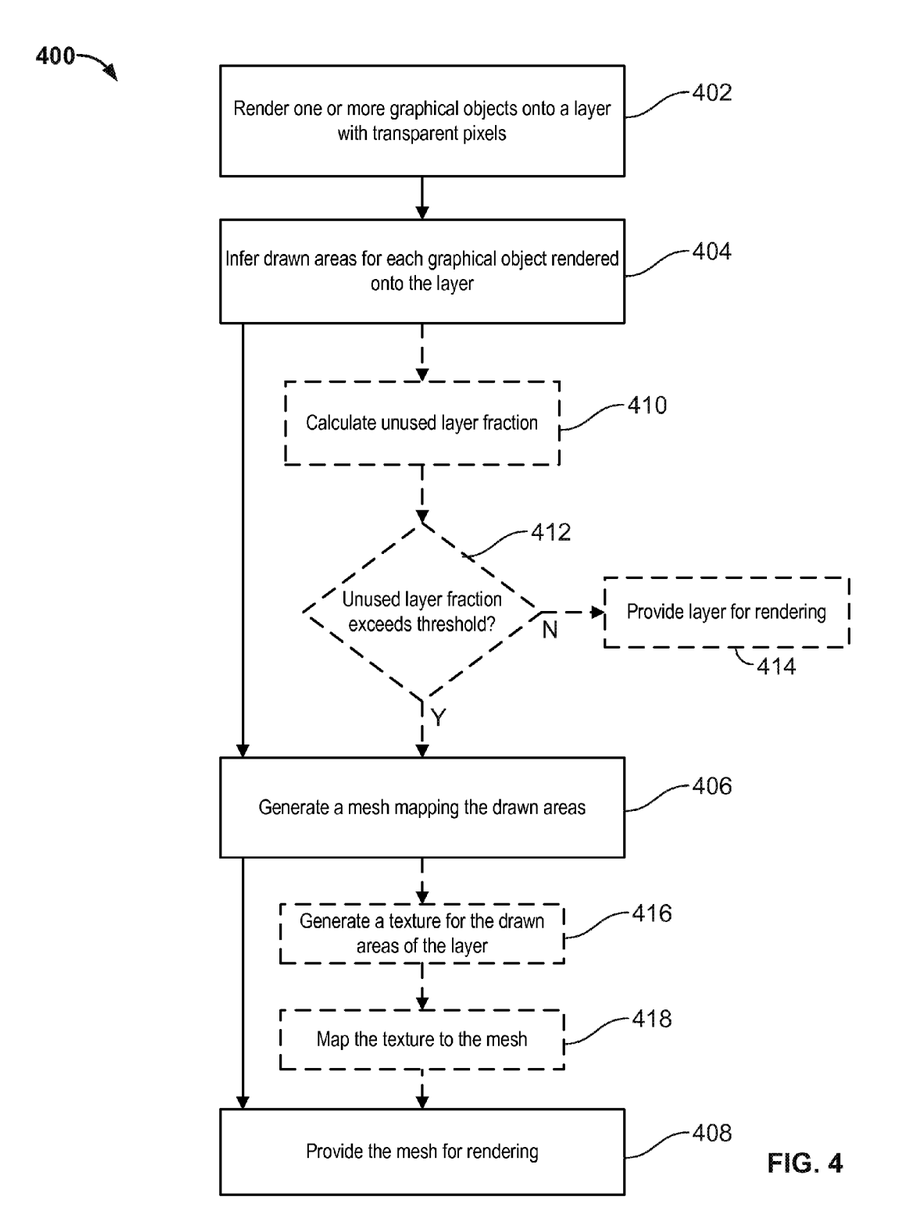
FIG. 4 is a flow chart of an example method for generating a mesh for use in rendering a layer on a display of a computing device.

FIG. 4 illustrates, with a flowchart 400, a process for displaying graphical objects as part of a display on a resource-constrained device. Although any steps of the described process may not be performed in some implementations, certain process steps are identified with solid lines and arrows and will be described first. Certain additional steps are identified with dotted lines and arrows, adding alternate paths to the flowchart 400 wherein these additional steps are also performed.

A layer having graphical objects and transparent pixels is generated (402). The layer may be generated by one or more applications responsible for rendering graphical objects requesting the layer and, using rendering rules associated with a graphical object and with the layer to render the graphical object into the layer. Pixels that are not involved in any of the rendering processes carried out by the applications may be transparent by default.

For each graphical object rendered onto the layer, a drawn area is inferred (404). As described above with respect to FIGS. 1, 2, and 3A-3C, the drawn area may be simple geometric shape such as a rectangle and may be inferred based on the dimensions of the graphical object. Alternatively, the drawn area may be a separate value stored or generated and associated with each graphical object or with the layer including one or more graphical objects.

The drawn areas should collectively include all non-transparent pixels on the layer, but it is not critical (in fact, often it is not feasible) that all transparent pixels be excluded from the drawn areas. In the earlier-described implementations, for example, the inferred areas were rectangles despite representing graphical objects that were round or irregular in shape. As another example, if the graphical object is text, transparent pixels may commingle with opaque pixels in a fashion very difficult to disambiguate while a rectangle around the text may serve well as the inferred drawn area for the text. Thus, in some embodiments, the drawn areas will represent a modest number of basic shapes despite the present of transparent pixels within the areas defined by those shapes.

A mesh mapping the drawn areas is generated (406). Although shown and described above with respect to a triangle mesh, any suitable data structure using any suitable shapes may be used. The complexity of the mesh may depend on the number of different triangles (or other included areas) that are listed, so a drawn area including some transparent pixels but nonetheless comprising a modest number of simple shapes, as described above, may serve well for this process.

The mesh is provided to the GPU or other graphics processing component for rendering (408). Because the mesh maps only those areas of the layer that include drawn pixels and therefore need to be rendered, the pixels outside the areas of the mesh are skipped and not processed, reducing the total number of pixels that have to be processed by the GPU or other processing component.

In some implementations, a mesh is not generated for every layer with transparent pixels, but only in layers that include enough undrawn areas for the transparent pixels to significantly impact fillrate utilization. Once the drawn areas are inferred (404), the fraction of the layer that is unused may be calculated (410). Where the number of drawn areas is relatively large, various estimation processes may be used to estimate the unused fraction of the layer; a precise value is not needed so long as the value allows a decision to be made regarding whether to generate the mesh. Also, for this purpose, the total drawn fraction (that is, the complement of the unused fraction) could also be used.

The unused fraction is compared against a threshold value (412), which may be any appropriate value, such as 20%, 40%, 60%, or 80%. The threshold may be a set value or may vary based on a number of factors. In some embodiments, certainly layers (such as an icon layer or widget layer) may have a set threshold. In other embodiments, threshold may be set taking into account such factors as the number of layers to be rendered, the actual or expected fillrate of the graphics processor, and the size of the display. If the unused fraction exceeds the threshold value, then a mesh is warranted to significantly optimize fillrate utilization (406). If the threshold is not reached, then the layer may be provided for rendering without the use of a mesh mapping the drawn areas (414).

In some implementations, a texture may be generated for the drawn areas of the layer (416). The texture may be mapped to the mesh (418), which may provide the graphics processor or other component the necessary information to render the mesh as part of the display (408).

Figure 5:
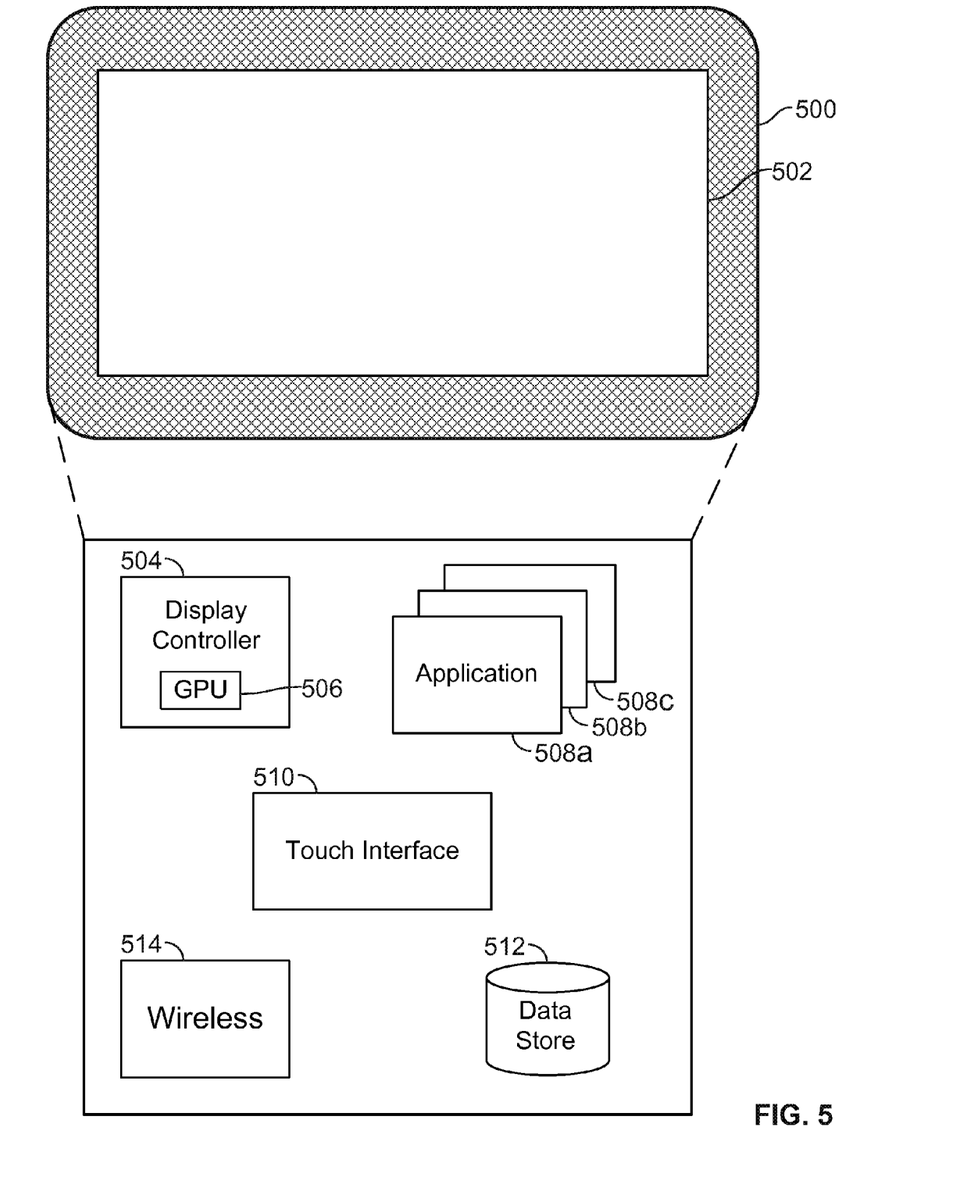
FIG. 5 shows aspects of an example device for displaying content, which may be used with the techniques described here.

FIG. 5 shows an example mobile device 500 for displaying content on a graphical user interface. The mobile device is shown here in the form of a tablet computer having a touchscreen 502 user interface of a familiar type.

The device 500 includes a number of components to assist in executing software in a manner that is pleasing and useful to a user. Certain example components are shown here. For example, a display controller 504 may be programmed to coordinate the display of various items on the touchscreen 502. For example, the display controller 504 may receive graphical input from a number of different applications 508a, 508b, 508c and from an operating system, and may determine the manner in which such items should be displayed. Each application 508a, 508b, 508c may be responsible for rendering one or more graphical objects for display, and may request one or more layers from the display controller 504, rendering objects to a layer in order to reduce redundant rendering. The display controller 504 may identify and manage a plurality of visual layers in order to process and display the graphical user interface. The display controller 504 may include a GPU or graphical processing unit 506 and any other components necessary to manage the display of the mobile device 500.

The display controller 504 may operate in the manner discussed above, for example, to generate and maintain graphical meshes in order to reduce unnecessary processing of transparent pixels within different layers of the graphical display, therefore increasing the speed and efficiency of the GPU 506.

A touch interface 510 may take a familiar form and may interpret input by a user on a touchscreen. The touch interface 510 may coordinate with the display controller 504 to identify what item or items on a display a user is selecting by touching at a particular location.

A data store 512 may store information about various entities needed to provide the functionality described here. For example, graphic object data and rendering instructions may be stored in a data store 512, and layer and/or mesh objects may be recorded and stored for retrieval as necessary. A wireless module 514 allows the device 500 to communicate wirelessly with other electronic computing devices (not shown).

Figure 6:
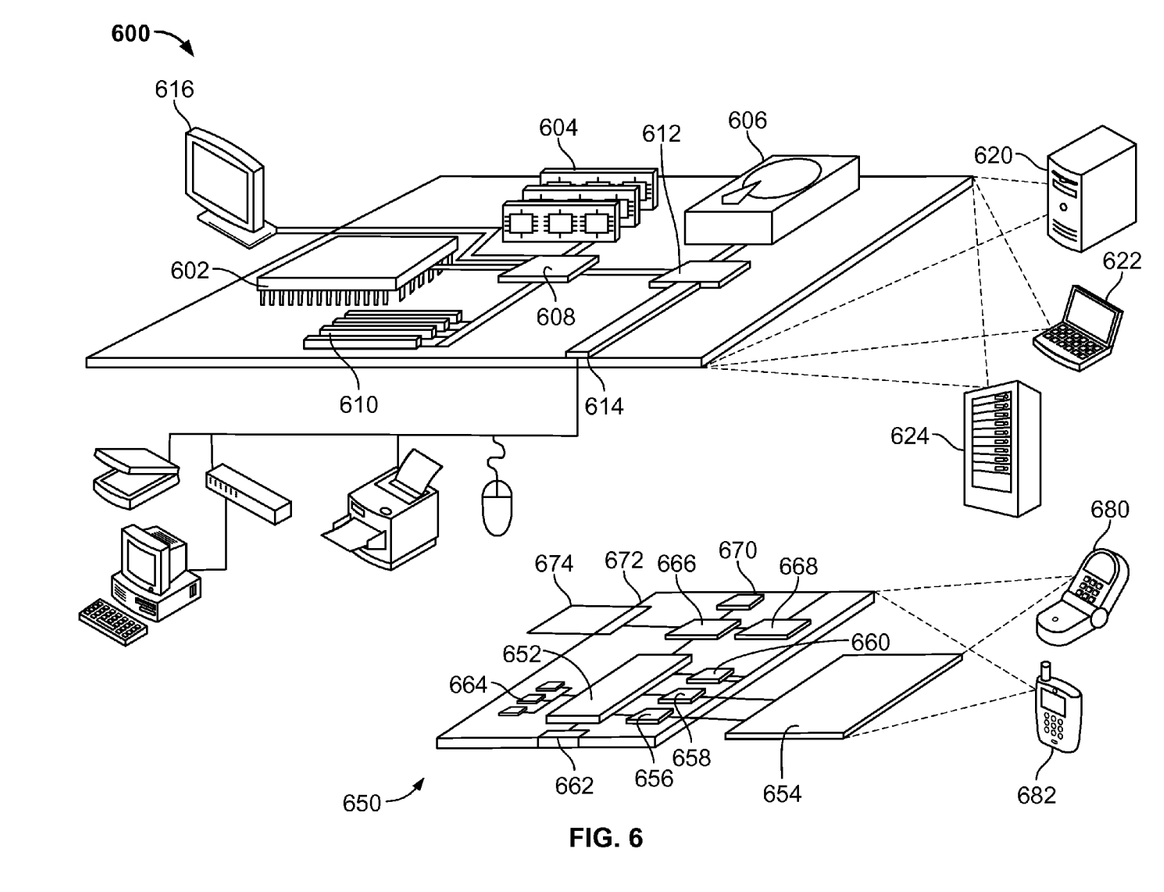
FIG. 6 shows an example of a generic computer device and a generic mobile computer device, which may be used with the techniques described here.

FIG. 6 shows an example of a generic computer device 600 and a generic mobile computer device 650, which may be used with the techniques described here.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, tablet computers and other similar computing devices. The components shown here, their connections and relationships, and their functions, are meant to be exemplary only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   rendering a layer of a graphical user interface into an off-screen buffer, the graphical user interface having transparent pixels and one or more graphical objects that comprise opaque pixels;
   identifying (i) a non-drawn area of the layer that has only transparent pixels and, (ii) for particular ones of the graphical objects rendered onto the layer of the graphical user interface, a drawn area of the layer, the drawn area encompassing the opaque pixels rendered in the off-screen buffer as the corresponding graphical object;
   generating a mesh that (i) maps to each of the drawn areas of the layer of the graphical user interface that encompass the opaque pixels that are rendered in the off-screen buffer as the corresponding graphical object, and (ii) does not map to the non-drawn area of the layer that has only transparent pixels; and
   providing, to a graphics processing unit, the mesh that (i) maps to each of the drawn areas of the layer of the graphical user interface that encompass the opaque pixels that are rendered in the off-screen buffer as the corresponding graphical object, and (ii) does not map to the non-drawn area of the layer that has only transparent pixels, to process the graphical user interface for display.

2. The method of claim 1, further comprising:
   receiving the mesh; and
   processing each pixel mapped by the mesh such that areas that have pixels that are not mapped by the mesh are not processed.

3. The method of claim 2, further comprising:
   receiving a background layer, the background layer having corresponding pixels to the non-drawn area of the layer that has only transparent pixels;
   processing the corresponding pixels of the background layer; and
   displaying at least some of the pixels mapped to the mesh and at least some of the corresponding pixels of the background layer at the same time on a graphical user interface.

4. The method of claim 1, wherein generating the mesh further comprises generating a texture that represents the drawn areas of the layer and mapping the texture to the mesh.

5. The method of claim 1, further comprising:
   determining an unused layer fraction that represents a fraction of the pixels of the layer that are not within any drawn area inferred for any graphical object rendered onto the layer; and
   determining that the unused layer fraction exceeds a threshold value,
   wherein generating the mesh is based on determining that the unused layer fraction exceeds a threshold value.

6. The method of claim 5, wherein the threshold value for generating the mesh is equal to or greater than 60%.

7. A system comprising:
   one or more computers and one or more storage devices storing instructions that are operable, when executed by the one or more computers, to cause the one or more computers to perform operations comprising:
   rendering a layer of a graphical user interface into an off-screen buffer, the graphical user interface having transparent pixels and one or more graphical objects that comprise opaque pixels;
   identifying (i) a non-drawn area of the layer that has only transparent pixels and, (ii) for particular ones of the graphical objects rendered onto the layer of the graphical user interface, a drawn area of the layer, the drawn area encompassing the opaque pixels rendered in the off-screen buffer as the corresponding graphical object;
   generating a mesh that (i) maps to each of the drawn areas of the layer of the graphical user interface that encompass the opaque pixels that are rendered in the off-screen buffer as the corresponding graphical object, and (ii) does not map to the, non-drawn area of the layer that has only transparent pixels; and
   providing, to a graphics processing unit, the mesh that (i) maps to each of the drawn areas of the layer of the graphical user interface that encompass the opaque pixels that are rendered in the off-screen buffer as the corresponding graphical object, and (ii) does not map to the non-drawn area of the layer that has only transparent pixels, to process the graphical user interface for display.

8. The system of claim 7, the operations further comprising:
   receiving the mesh; and
   processing each pixel mapped by the mesh such that areas that have pixels that are not mapped by the mesh are not processed.

9. The system of claim 8, the operations further comprising:
   receiving a background layer, the background layer having corresponding pixels to the non-drawn area of the layer that has only transparent pixels;
   processing the corresponding pixels of the background layer; and
   displaying at least some of the pixels mapped to the mesh and at least some of the corresponding pixels of the background layer at the same time on a graphical user interface.

10. The system of claim 7, wherein generating the mesh further comprises generating a texture that represents the drawn areas of the layer and mapping the texture to the mesh.

11. The system of claim 7, the operations further comprising:
    determining an unused layer fraction that represents a fraction of the pixels of the layer that are not within any drawn area inferred for any graphical object rendered onto the layer; and
    determining that the unused layer fraction exceeds a threshold value,
    wherein generating the mesh is based on determining that the unused layer fraction exceeds a threshold value.

12. The system of claim 11, wherein the threshold value for generating the mesh is equal to or greater than 60%.

13. A non-transitory computer-readable medium storing software comprising instructions executable by one or more computers which, upon such execution, cause the one or more computers to perform operations comprising:
- rendering a layer of a graphical user interface into an off-screen buffer, the graphical user interface having transparent pixels and one or more graphical objects that comprise opaque pixels;
- identifying (i) a non-drawn area of the layer that has only transparent pixels and, (ii) for particular ones of the graphical objects rendered onto the layer of the graphical user interface, a drawn area of the layer, the drawn area encompassing the opaque pixels rendered in the off-screen buffer as the corresponding graphical object;
- generating a mesh that (i) maps to each of the drawn areas of the layer of the graphical user interface that encompass the opaque pixels that are rendered in the off-screen buffer as the corresponding graphical object, and (ii) does not map to the, non-drawn area of the layer that has only transparent pixels; and
- providing, to a graphics processing unit, the mesh that (i) maps to each of the drawn areas of the layer of the graphical user interface that encompass the opaque pixels that are rendered in the off-screen buffer as the corresponding graphical object, and (ii) does not map to the non-drawn area of the layer that has only transparent pixels, to process the graphical user interface for display.

14. The medium of claim 13, the operations further comprising:
- receiving the mesh; and
- processing each pixel mapped by the mesh such that areas that have pixels that are not mapped by the mesh are not processed.

15. The medium of claim 14, the operations further comprising:
- receiving a background layer, the background layer having corresponding pixels to the non-drawn area of the layer that has only transparent pixels;
- processing the corresponding pixels of the background layer; and displaying at least some of the pixels mapped to the mesh and at least some of the corresponding pixels of the background layer at the same time on a graphical user interface.

16. The medium of claim 13, wherein generating the mesh further comprises generating a texture that represents the drawn areas of the layer and mapping the texture to the mesh.

17. The medium of claim 13, the operations further comprising:
- determining an unused layer fraction that represents a fraction of the pixels of the layer that are not within any drawn area inferred for any graphical object rendered onto the layer; and
- determining that the unused layer fraction exceeds a threshold value,
- wherein generating the mesh is based on determining that the unused layer fraction exceeds a threshold value.

18. The medium of claim 17, wherein the threshold value for generating the mesh is equal to or greater than 60%.

* * * * *